(12) United States Patent
McDade et al.

(10) Patent No.: US 10,217,328 B2
(45) Date of Patent: *Feb. 26, 2019

(54) ASSISTED SERVICE TERMINAL

(75) Inventors: Fiona McDade, Dundee (GB); John Hall, Angus (GB); Kisan Choutapelly, Hyderabad (IN)

(73) Assignee: NCR Corporation, Atlanta, GA (US)

(*) Notice: Subject to any disclaimer, the term of this patent is extended or adjusted under 35 U.S.C. 154(b) by 40 days.

This patent is subject to a terminal disclaimer.

(21) Appl. No.: 12/951,503

(22) Filed: Nov. 22, 2010

(65) Prior Publication Data
US 2012/0023028 A1    Jan. 26, 2012

(51) Int. Cl.
| G06Q 10/10 | (2012.01) |
| G06Q 30/02 | (2012.01) |
| G06Q 10/06 | (2012.01) |
| G07F 19/00 | (2006.01) |
| G06Q 10/00 | (2012.01) |
| G07F 9/02 | (2006.01) |

(52) U.S. Cl.
CPC ......... *G07F 19/209* (2013.01); *G06Q 10/20* (2013.01); *G07F 9/023* (2013.01); *G07F 19/206* (2013.01)

(58) Field of Classification Search
CPC .................................................. G06Q 10/20
USPC .................................................. 705/1.1–912
See application file for complete search history.

(56) References Cited

U.S. PATENT DOCUMENTS

| 5,091,713 | A | * | 2/1992 | Horne | G07F 5/18 194/204 |
| 5,253,167 | A | * | 10/1993 | Yoshida | G06Q 20/1085 235/379 |
| 5,451,757 | A | * | 9/1995 | Heath, Jr. | 340/5.4 |
| 5,983,197 | A | * | 11/1999 | Enta | G06Q 10/04 235/379 |
| 5,984,178 | A | * | 11/1999 | Gill | G06Q 20/1085 235/376 |
| 6,279,826 | B1 | * | 8/2001 | Gill | G06Q 20/18 235/379 |
| 6,308,887 | B1 | * | 10/2001 | Korman | G06Q 20/18 235/379 |
| 6,789,730 | B1 | * | 9/2004 | Trelawney | G07F 9/026 235/376 |
| 6,941,274 | B1 | * | 9/2005 | Ramachandran | G06Q 20/10 235/379 |
| 8,118,215 | B2 | * | 2/2012 | Coventry | G06Q 20/1085 235/379 |
| 8,708,226 | B2 | * | 4/2014 | Osborne | G06Q 20/1085 235/379 |

(Continued)

*Primary Examiner* — Jonathan P Ouellette
(74) *Attorney, Agent, or Firm* — Schwegman, Lundberg & Woessner (57) ABSTRACT

An assisted service terminal is described. The terminal comprises a currency dispenser; and an operator computer coupled to the currency dispenser. The operator computer includes: (i) an agent arranged to communicate status information to a remote management system, and (ii) a dashboard application. The dashboard application is arranged to (a) receive status messages from the currency dispenser indicative of a fault in the currency dispenser, (b) present the received status messages to an operator, and (c) notify the agent to issue a request to create an incident on the remote management system in response to the operator indicating that the fault cannot be resolved without a visit from a service engineer.

13 Claims, 5 Drawing Sheets

(56) References Cited

U.S. PATENT DOCUMENTS

| | | | |
|---|---|---|---|
| 2002/0032655 A1* | 3/2002 | Antonin | G06Q 20/1085 |
| | | | 705/43 |
| 2002/0082994 A1* | 6/2002 | Herziger | 705/43 |
| 2003/0169691 A1* | 9/2003 | Powers et al. | 370/241 |
| 2004/0149818 A1* | 8/2004 | Shepley | G07F 19/20 |
| | | | 235/379 |
| 2009/0188973 A1* | 7/2009 | Coventry | G07F 19/20 |
| | | | 235/379 |
| 2009/0200365 A1* | 8/2009 | Hurrell | G07F 19/20 |
| | | | 235/375 |
| 2011/0010221 A1* | 1/2011 | Horn | 705/9 |
| 2011/0258090 A1* | 10/2011 | Bosch | G06Q 10/087 |
| | | | 705/30 |

* cited by examiner

ASSISTED SERVICE TERMINAL

FIELD OF THE INVENTION

The present invention relates to improvements in or relating to assisted service terminals.

BACKGROUND OF INVENTION

An assisted service terminal (AST) is a networked device that is operated (periodically or continuously) by a staff member who is trained to use that device. Unlike a self-service terminal, it is not designed to be operated primarily by untrained customers, but by trained members of staff.

Self-service terminals (SSTs) typically include a mechanism for automatically reporting status information (including faults and errors) to a remote management system. Such systems can be very effective for SSTs because every fault that cannot be rectified automatically by the SST eventually needs a service engineer to visit the SST to correct the fault. However, ASTs are operated by a trained user, so automated dispatch of a service engineer to correct a fault is not always appropriate.

It is among the objects of an embodiment of the present invention to provide an improved mechanism for reporting status information (including faults and errors) for an AST to a remote management system.

SUMMARY OF INVENTION

Accordingly, the invention generally provides methods, systems, apparatus, and software for improved assisted service terminal fault handling.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided an assisted service terminal comprising:

a currency dispenser; and an operator computer coupled to the currency dispenser, the operator computer including: (i) an agent arranged to communicate status information to a remote management system; (ii) a dashboard application arranged to (a) receive status messages from the currency dispenser indicative of a fault therein, (b) present the received status messages to an operator, and (c) notify the agent to issue a request to create an incident on the remote management system in response to the operator indicating that the fault cannot be resolved without a visit from a service engineer.

The operator computer may further comprise (iii) a control application arranged to control the operation of the currency dispenser and to provide a user interface to the operator.

The currency dispenser may also include a deposit facility that allows deposited currency to be dispensed in a subsequent transaction; in other words, the currency dispenser may comprise a currency recycler.

The dashboard application may present an option on a graphical user interface enabling the operator to indicate that the fault cannot be resolved without a visit from a service engineer and thereby request a visit from the service engineer.

The dashboard application may be arranged to receive status messages directly from the currency dispenser. Alternatively, the dashboard application may be arranged to receive status messages relating to the currency dispenser from a communication channel proxy connected to both the currency dispenser and the control application.

The dashboard application may be arranged to notify the agent to issue a request to create an incident on a remote management system directly or indirectly. An indirect notification may include creating a management event in a repository monitored by the agent, so that when the management event is created, the agent transmits status information based on that management event. One example of a management event is a WMI event.

The remote management system may create an incident in response to any status message indicating a fault in the currency recycler. The remote management system may close an incident in response to any status message indicating that a previously reported fault in the currency recycler has now been corrected. Such a status message may be generated in response to the operator selecting an option on the dashboard application indicating that the fault has been resolved.

The remote management system may delay dispatch of a service engineer until a defined time has elapsed without the previously reported fault being corrected. The defined time may be, for example, approximately one hour. This may be useful in management systems that manage both SSTs and ASTs, and that cannot easily distinguish between these two types of terminals. Alternatively, the remote management system may not dispatch a service engineer until it receives a specific dispatch request from an AST. This may be useful where the management system can recognise that a particular reported fault was generated by an AST.

The agent may be a simple network management protocol (SNMP) status agent that sends a trap each time a monitored device (such as a WMI object, or the like) changes its state. Alternatively, the agent may be a Web services component.

The agent and the dashboard application may be provided as components of a status monitoring application.

The status monitoring application may further comprise a communication channel proxy for intercepting messages transmitted between the control application and the currency recycler and copying these messages to the dashboard application. This would allow the dashboard application and the agent to be used in a system that includes a third party control application.

The currency recycler preferably includes recycler controller (including firmware) for controlling internal components within the currency recycler and reporting status information to the control application.

The status monitoring application may include a notification filter to allow a user (such as a configuration engineer) of the assisted service terminal to select what types of status notifications are presented to the operator.

The status monitoring application may include a message filter to allow a user of the assisted service terminal to select what type of status information (for example, errors, inventory, and the like) is transmitted to the remote management system.

This aspect has the advantage that a user of the assisted service terminal can configure the terminal so that the operator is informed of every error that occurs in the currency recycler. A remote management system is preferably also informed of every error so that an incident can be created and there is a complete record of every error. However, if the operator corrects the error then the operator can trigger a message to be sent automatically to close the created incident, thereby ensuring that no service engineer is dispatched. This ensures that both the operator and the management system can be made aware of all errors (or all relevant errors, if configured to filter out some errors), but no service engineer is dispatched where a local resolution is achieved, thereby saving valuable resources.

By enabling the operator to request a visit from a service engineer (for example, using an agent (a software component)), the remote management system can receive automated requests from self-service terminals (such as ATMs) on the same interface as requests from operators of assisted service terminals. This simplifies management of mixed networks (including both self-service terminals and assisted service terminals) by using a single remote management system.

According to a second aspect there is provided a method of operating an assisted service terminal, the method comprising:

receiving a status message from a currency dispenser, where the status message is indicative of a fault therein;

providing details of the fault to an operator of the assisted service terminal to allow the operator to attempt to correct the fault;

sending an updated status message from the assisted service terminal in the event that the operator has corrected the fault; and sending a request for a service engineer to correct the fault in response to a selection by the operator indicating that the operator cannot correct the fault.

The method may comprise the further step of confirming to the operator that a request for a service engineer has been dispatched.

The step of receiving a status message from a currency dispenser may comprise the step of receiving a status message from a currency recycler, where the status message is indicative of a fault in the currency recycler.

The step of sending an updated status message from the assisted service terminal may include: automatically detecting that the fault has been corrected, and sending the updated status message in response to this automatic detection. Alternatively, the step of sending an updated status message from the assisted service terminal may include: detecting an operator input indicating that the fault has been corrected, and sending the updated status message in response to this detected operator input.

The step of confirming to the operator that a request for a service engineer has been dispatched may include displaying an incident code to the operator and/or providing an estimated time when the service engineer will arrive.

According to a third aspect there is provided a managed terminal system comprising:

a central management system for managing a plurality of terminals; and an assisted service terminal coupled to the central management system by a network;

wherein the assisted service terminal comprises a currency dispenser, and an operator computer coupled to the currency dispenser, the operator computer including: (i) an agent arranged to communicate status information to the central management system, and (ii) a dashboard application arranged to (a) receive status messages from the currency dispenser indicative of a fault in the currency dispenser, (b) present the received status messages to an operator, and (c) notify the agent to issue a request to create an incident on the central management system in response to the operator indicating that the fault cannot be resolved without a visit from a service engineer.

The operator computer may further comprise (iii) a control application arranged to control the operation of the currency dispenser and to provide a user interface to the operator.

The currency dispenser may comprise a currency recycler.

The managed terminal system may further comprise a self-service terminal. The self-service terminal may be an automated teller machine (ATM).

According to a fourth aspect there is provided a computer program comprising program instructions for (i) receiving status messages from a currency dispenser indicative of a fault therein, (ii) presenting the received status messages to an operator, and (iii) detecting the operator indicating that the fault cannot be resolved without a visit from a service engineer, and (iv) issuing a request to create an incident on a remote management system.

The computer program may be executing in computer memory, embodied on a storage medium, or transmitted on a carrier.

For clarity and simplicity of description, not all combinations of elements provided in the aspects recited above have been set forth expressly. Notwithstanding this, the skilled person will directly and unambiguously recognise that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
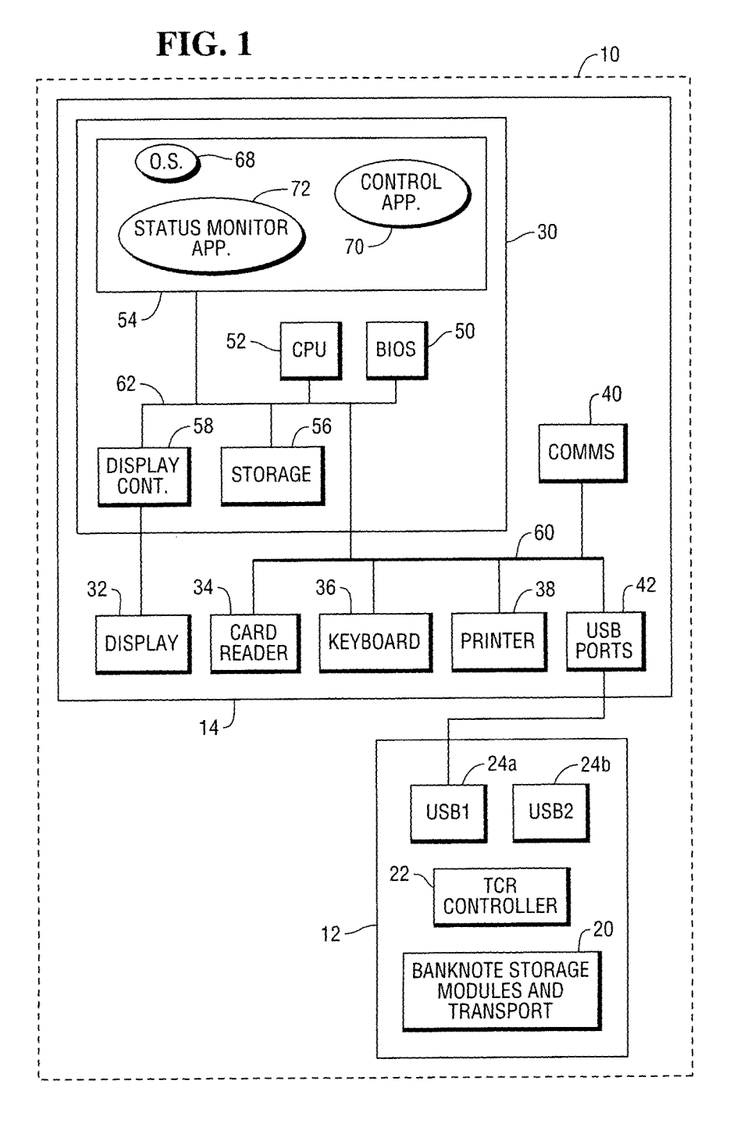
FIG. 1 is a simplified block diagram of an assisted service terminal (AST) according to one embodiment of the present invention.

Reference is first made to FIG. 1, which is a simplified, block diagram of a terminal 10, in the form of an assisted service terminal (AST), according to one embodiment of the present invention.

The AST 10 comprises a currency recycler 12 coupled to an operator computer 14. One suitable currency recycler is the NCR 6610 (trade mark) Teller Cash Recycler (TCR) currency recycler available from NCR Corporation, 3097 Satellite Blvd., Duluth, Ga. 30096, U.S.A.

The currency recycler 12 comprises a plurality of components, but only the components relevant to this embodiment are shown in FIG. 1 because currency recyclers are well known to those of skill in the art. These components include: banknote storage modules, transport arrangements, a banknote entrance aperture, and a banknote exit aperture, collectively referred to as the "currency handling components" and shown as block 20 in FIG. 1. These components also include: a currency recycler controller programmed with firmware, collectively referred to as the "programmed TCR controller" 22; and a communications facility 24 in the form of a pair of USB ports (24a and 24b) and an associated software stack. The pair of USB ports 24 allow two different operator computers 14 to control the currency recycler 12, with each operator computer 14 relinquishing control of the currency recycler 12 at the end of each transaction so that the other operator computer 14 can take control of the currency recycler 12 for a transaction.

The programmed TCR controller 22 is responsible for controlling the operation of the currency recycler 12 and also for monitoring the devices (including various sensors) within the currency recycler 12 for any status changes or changes during operation that should be reported to the operator computer 14.

The operator computer 14 is based on a conventional personal computer and comprises: a core controller 30, a display 32, a card reader 34 (which is optional), a keyboard 36 for inputting data, a printer 38 (optional), a network connection module 40 (in the form of an enhanced network connection) for accessing a remote management system (not shown in FIG. 1) via a private IP network (not shown in FIG. 1), and a set of USB ports 42.

The core controller 30 comprises a Basic Input/Output System (BIOS) 50 stored in non-volatile memory, a microprocessor 52, main memory 54, data storage 56 in the form of a magnetic disk drive, and a display controller 58 in the form of a graphics card.

The display 32 is connected to the core controller 30 via the graphics card 58 installed in the core controller 30. The other devices (34 to 40) are connected to the core controller 30 via a device bus 60 and one or more internal controller buses 62.

When the operator computer 14 is powered up, the main memory 54 is loaded with an operating system 68, a control application 70, a status monitor application 72, all of which are stored on the magnetic disk drive 56.

The operating system 68 is a conventional Microsoft XP (trade mark) operating system, although any convenient operating system may be used.

In this embodiment, the control application 70 is the Aptra Cash Connect (trade mark) control application, available from NCR Corporation, 3097 Satellite Blvd., Duluth, Ga. 30096, U.S.A. As is known in the art, the control application 70 provides an operator at the operator computer 14 with a graphical user interface (GUI) including a sequence of screens (an application flow) to execute transactions (such as currency dispense and currency deposit) at the currency recycler 12.

Figure 2:
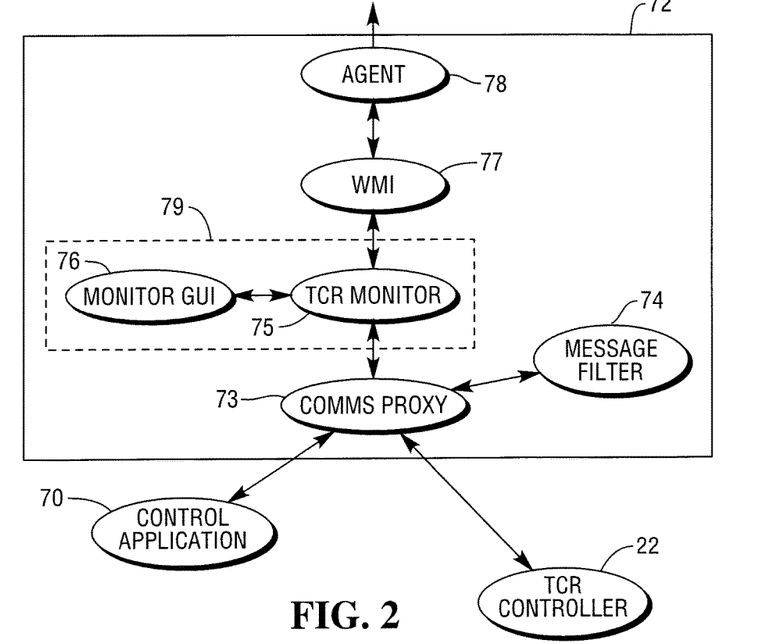
FIG. 2 is a simplified block diagram illustrating how software components within the AST interact.

The status monitor application 72 comprises a plurality of components, as illustrated in FIG. 2. These components include: a communication channel proxy 73; a message filter 74; a TCR monitor component 75; a monitor graphical user interface (GUI) 76 associated with the TCR monitor component 75; a WMI component 77; and an SNMP agent 78. The combination of the TCR monitor component 75 and the monitor GUI 76 may be referred to as the dashboard application 79.

The communication channel proxy 73 is connected to both the currency recycler 12 (specifically the programmed TCR controller 22) and the control application 70 so that all messages transmitted from the programmed TCR controller 22 to the control application 70, and from the control application 70 to the programmed TCR controller 22, are routed through the communication channel proxy 73.

The communication channel proxy 73 ensures that all messages transmitted from the programmed TCR controller 22 are sent to the control application 70 (and vice versa). However, the communication channel proxy 76 also sends some messages (referred to herein as "filtered messages") from the programmed TCR controller 22 to the TCR monitor component 75 (in addition to sending those messages to the control application 70).

The communication channel proxy 73 knows which messages to copy to the TCR monitor component 75 (the filtered messages) because the message filter 74 identifies those messages (based on defined criteria) and informs the communication channel proxy 73 that they should be copied to the TCR monitor component 75.

The message filter 74 is configurable (that is, the defined criteria can be changed), so that the type of messages that will be copied by the communication channel proxy 73 to the TCR monitor component 75 can be selected by a user. For example, the message filter 74 may be configured to identify both error messages and inventory messages. Alternatively, the message filter 74 may be configured to identify only error messages, or only a sub-set of available error messages. In this embodiment, only error messages are identified. These error messages include status codes identifying the type of error detected.

The TCR monitor component 75 receives copies of filtered messages and updates the WMI component 77 in response to those filtered messages. This involves populating WMI class properties and raising a WMI event (all contained within the WMI component 77). This WMI event is detected by the SNMP agent 78, which monitors for WMI events.

The SNMP agent 78 sends traps to a remote management system (not shown) via the network connection 40 in response to detected WMI events.

Figure 3:
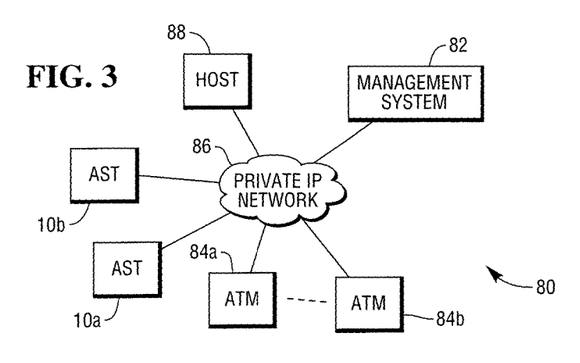
FIG. 3 is a block diagram illustrating a managed network including a plurality of ASTs of FIG. 1 and a plurality of self-service terminals (SSTs)

Reference will now also be made to FIG. 3, which is a block diagram illustrating a mixed terminal managed network 80 comprising a central management system 82 coupled to a plurality of ASTs (only two of which are illustrated in FIG. 3) 10a,b and a plurality of ATMs (only two of which are illustrated in FIG. 3) 84a,b by a private IP network 86. A transaction host 88 is also coupled to the terminals 10,84 by the private IP network 86 to provide transaction services to the terminals 10,84.

In this embodiment, the management system 82 is based on a Gasper Vantage (trade mark) management system that includes an SNMP manager plug-in and a currency recycler plug-in. The Gasper Vantage (trade mark) management system is available from NCR Corporation.

The operation of the dashboard application 79 within the operator computer 14 will now be described with reference to FIG. 4, which is a flow diagram illustrating a detected fault being corrected by an operator of the AST 10.

Initially, the currency recycler 12 detects a fault (step 100) in one of its components. The currency recycler 12 (specifically the programmed TCR controller 22) notifies the operator computer 14 (specifically the control application 70) of this fault (step 102) via the communication channel proxy 73.

The message filter 74 indicates to the communication channel proxy 73 that this communication should also be copied to the TCR monitor 75. The communication channel proxy 73 then transmits the fault message to both the control application 70 and the TCR monitor 75 (step 104).

The TCR monitor 75 populates WMI class properties based on the contents of the message and creates a WMI event (step 106) indicating the nature of the fault.

The SNMP agent 78 detects the WMI event and transmits a trap (including details of the fault) to the management system 82 (step 108). All communications between the operator computer 14 and the management system 82 are via the SNMP agent 78.

The management system 82 and the dashboard application 79 process the fault notification in parallel, although it will be described sequentially herein.

The management system 82 uses the fault notification to add the fault to its fault log (step 110). The fault log contains a list of all faults reported by every terminal 10,84 on the managed network 80, irrespective of whether the faults are resolved without having to dispatch a service engineer.

The management system 82 then creates an incident based on this fault (step 112). The incident is assigned low priority at the time of creation, for reasons that will become clear hereafter.

Figure 5:
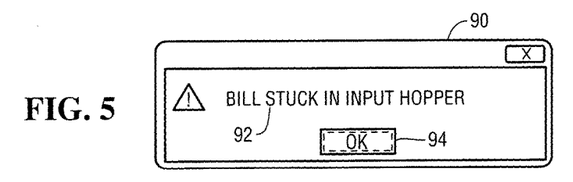
FIG. 5 is a pictorial diagram of an active window presented to an operator of the AST of FIG. 1 when a fault is detected within the AST.

As shown in FIG. 5, the control application 70 presents an active window 90 containing a basic information field 92 that presents basic information to the operator about the nature of the fault. In a similar manner as for conventional dialog boxes, the active window 90 can be cancelled by clicking on an "OK" control 94 or on the "x" control at the top of the box.

One of the primary functions of the active window 90 is to alert the operator to the fault so that the operator will click on the dashboard icon in the system tray to obtain more detailed information about the fault by opening the dashboard application 79 (specifically the monitor GUI 76).

The dashboard application 79 normally executes as a background service, and can be opened up by clicking on a dashboard icon on a system tray of a GUI of the operating system 68. When a fault has occurred, the dashboard icon indicates this visually by an exclamation mark in front of (overlaying) the dashboard icon on the system tray. The dashboard application 79 also creates an active window (a dialog box) (step 120) alerting the operator to the fault, as shown in, in response to the operator clicking on the dashboard icon.

Figure 6:
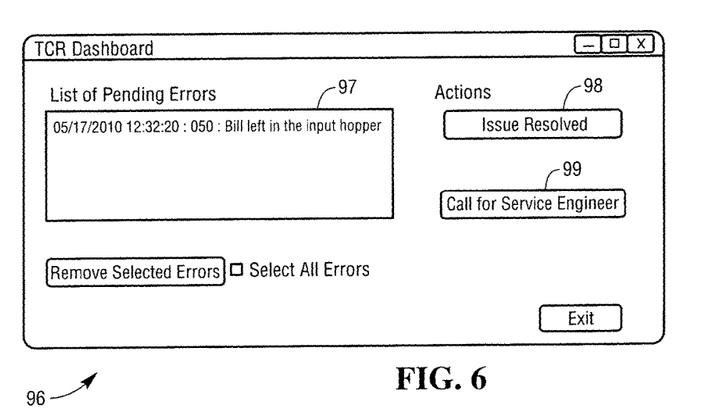
FIG. 6 is a pictorial diagram of a graphical user interface presented on the AST of FIG. 1 and describing the detected fault of FIG. 4.

Reference will now also be made to FIG. 6, which is a pictorial illustration of a dashboard application screen 96. The screen 96 shows a description field 97 comprising information about the nature, time, and date of the fault. The description field 97 also includes the status code ("050" in this example) that was received from the TCR controller 22.

In this embodiment, the control application 70 (which is independent of the dashboard application 79) includes (or has access to) multi-media content that can provide step-by-step instructions for correcting common faults in the currency recycler 12. However, the operator must use the control application 70 to access that information.

The dashboard application 79 includes (or has access to) a TCR status code table that maps status codes that are sent by the programmed TCR controller 22 into fault descriptions for presenting to the operator. This allows the dashboard application 79 (specifically the monitor GUI 76) to provide a human operator with a description of the fault, for example, "bill left in the input hopper", or "currency exit is blocked", and other information (such as a time at which the fault was detected) in the description field 97.

The operator then attempts to correct this fault (step 122). In this example, the operator is successful.

The operator can then highlight the fault that is still displayed on the dashboard application 79 (even though the fault has now been cleared), and select an "Issue Resolved" option 98 (step 124) on the dashboard application screen 96. There may be multiple faults displayed by the dashboard application 79. For example, the operator may defer resolving one fault until another event has occurred, during which time, a further fault may develop.

Selection of the "Issue Resolved" option 98 causes the TCR monitor 75 to create a WMI event relating to that fault (step 126).

The SNMP agent 78 detects this WMI event and transmits a "Fault Cleared" message to the management system 82 (step 128).

The management system 82 receives this "Fault Cleared" message and updates its message log to indicate that the fault has been resolved and clears the incident that was created for the fault (step 130). Depending on how the management system 82 operates, clearing the incident may involve updating the status of the incident as closed, cancelling the incident, or deleting the incident.

Figure 7:
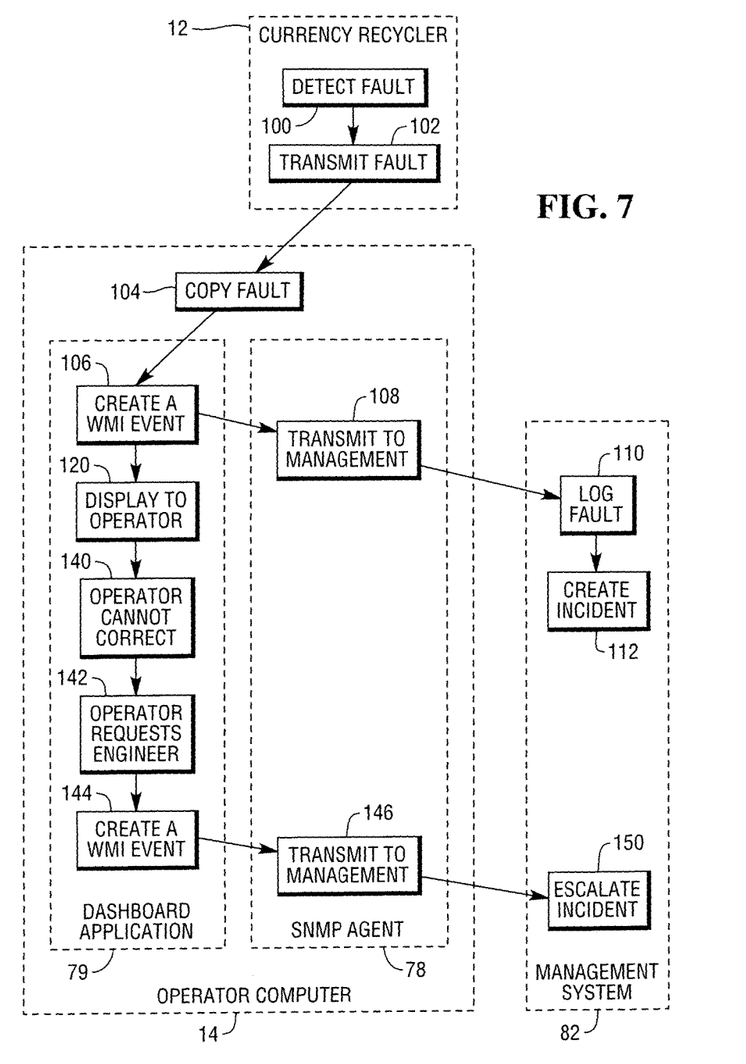
FIG. 7 is a simplified flow diagram illustrating a detected fault that cannot be corrected by an operator of the AST of FIG. 1.

Reference will now also be made to FIG. 7, which is a flow diagram illustrating a detected fault that cannot be corrected by an operator of the AST 10.

Figure 4:
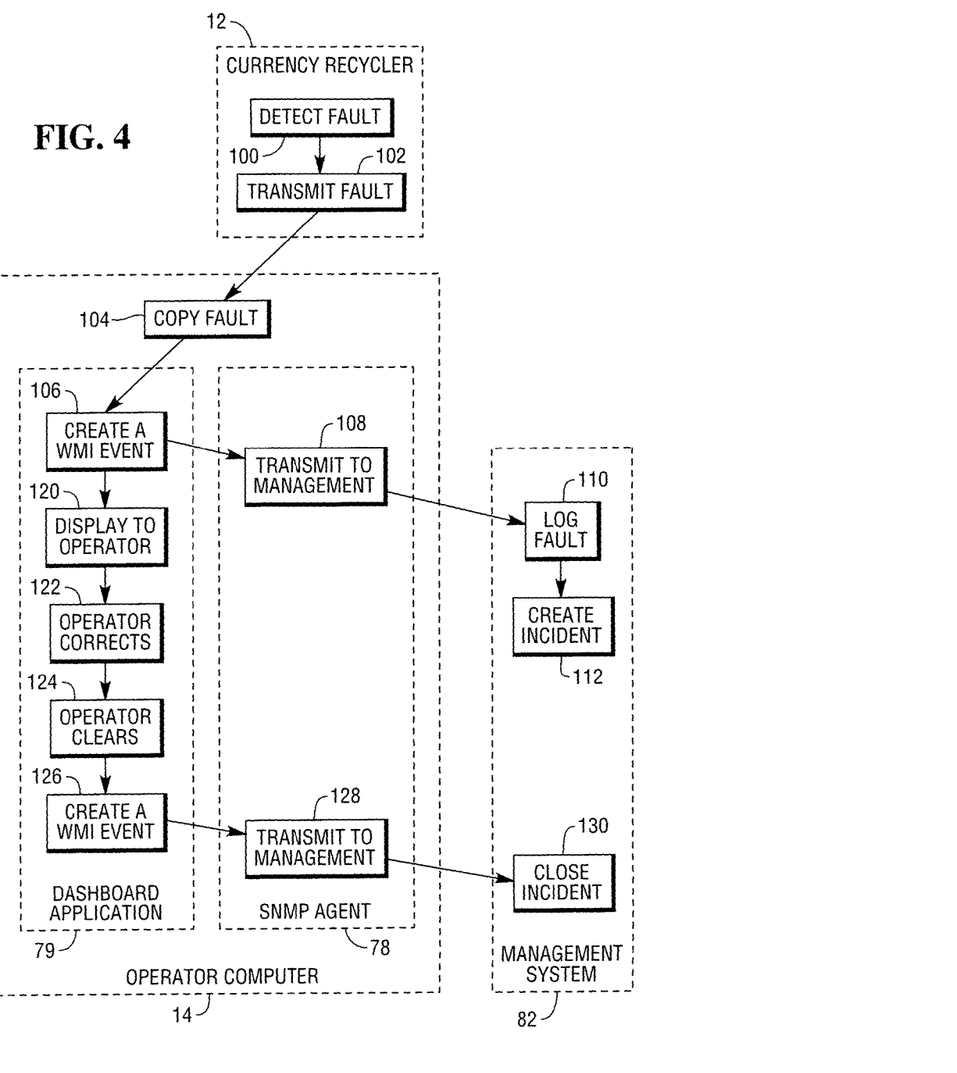
FIG. 4 is a simplified flow diagram illustrating a detected fault being corrected by an operator of the AST of FIG. 1.

Steps 100 to 120 of FIG. 7 are identical to the corresponding steps of FIG. 4, so will not be described again. However, in FIG. 7, once the fault has been presented to the operator on the display 32, the operator either attempts to correct the fault and fails, or does not attempt to correct the fault (for example, because the fault relates to a component that the operator cannot access or is not authorized to access); either way, the fault is not corrected (step 140).

The operator then highlights the fault on the dashboard application screen 96 and selects a "Call for Service Engineer" option 99 (FIG. 6) (step 142).

Selection of the "Call for Service Engineer" option 99 causes the TCR monitor 75 to create a WMI event relating to that fault (step 144).

The SNMP agent 78 detects this WMI event and transmits a "Service Call Needed" message to the management system 82 (step 146).

The management system 82 receives this "Service Call Needed" message and updates its message log to indicate that the fault has not been resolved and escalates the incident that was created for the fault (step 150) so that a service engineer will be dispatched without delay.

Once the Service Call Needed message has been sent, the monitor GUI 76 updates the dashboard screen 96 to show a dialog box 160 (see FIG. 8, which is a pictorial diagram of a graphical user interface presented on the display 32) indicating to the operator that a service engineer has been called.

Figure 8:
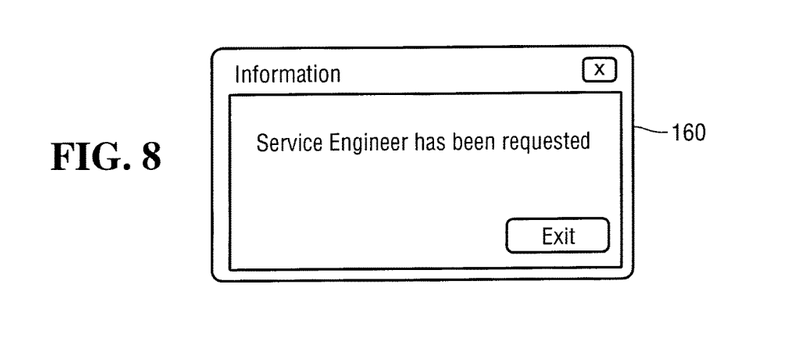
FIG. 8 is a pictorial diagram of a graphical user interface presented on the AST of FIG. 1 indicating that a service engineer has been called.

If the operator manages to resolve the fault subsequent to sending the "Service Call Needed" message, then the operator can still select the "Issue Resolved" option 98 and clear the escalated incident thereby cancelling the request for a visit from the service engineer.

If the service engineer arrives and resolves the fault, then the service engineer (or the operator) can select the Issue Resolved" option 98 to clear the escalated incident. Alternatively, the service engineer may clear the escalated incident using any other convenient technique, such as calling an incident desk at the remote management system 82, or sending an email or text to the remote management system 82 indicating that the fault has now been resolved.

It will now be appreciated that this embodiment has the advantage that an assisted service terminal can be coupled to an automated management system that can manage both self-service terminals (such as automated teller machines) and assisted service terminals using a message agent system. The operator is informed of all faults on the currency recycler, so that those faults that can be corrected locally by the operator are corrected, without requiring a visit from a service engineer.

Various modifications may be made to the above described embodiment within the scope of the invention, for example, in other embodiments, the agent may be a different type of agent than an SNMP agent, for example, a Web services agent may be used.

In other embodiments, a currency dispenser may be used instead of the currency recycler. The currency dispenser may dispense coins and/or banknotes. Similarly, the currency recycler may also receive and dispense coins and/or banknotes.

In other embodiments, the programmed TCR controller may be a personal computer.

In other embodiments, the communications facilities 24,42 may be RS232 ports, Ethernet cards, or the like.

In other embodiments, instead of providing a GUI, the dashboard application 79 may provide a command and response text-based interface.

In other embodiments, any additional errors or alerts encountered by the control application 70 may be monitored so that a trap is sent to the remote management system to indicate the status of the control application 70.

In other embodiments, the management system may be a different system to that described above.

In other embodiments, the assisted service terminals may not handle currency, they may handle gaming tickets, coupons, passes, or the like.

In other embodiments, the remote management system may communicate with the AST 10 by sending messages to the agent 78, in addition to receiving messages from the agent 78.

In other embodiments, an event (such as a trap) may be triggered when the control application 70 relinquishes control of the currency recycler 12. This would allow the remote management system 82 to know when it could control the currency recycler 12, for example, to request the currency recycler 12 to perform an operation (such as a self-test); thereby enabling the remote management system to control the currency recycler 12 without using the control application 70.

In other embodiments, the dashboard application 79 may include, or have access to, multi-media content for guiding an operator through a series of steps to correct a fault that has been detected.

In other embodiments, the currency recycler may automatically detect a change in status of the device that was previously faulty, so that a new status notification can be sent to the remote management system without the operator having to request such a notification to be sent.

In other embodiments, the status messages may include unsolicited event messages in addition to responses to commands.

In other embodiments, the dashboard application 79 may be directly connected to the remote management system 82 so that error messages (or the like) can be transmitted directly thereto without having to route through the agent 78.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

What is claimed is:

1. An assisted service terminal operable by a local operator trained to correct faults associated with the assisted service terminal, the assisted service terminal comprising:
   a currency dispenser including a currency recycler integrated into the currency dispenser; and
   an operator computer coupled to the currency dispenser, the operator computer including:
   (i) an agent configured to execute on the operator computer and further configured during execution to communicate status information to a remote management system, and wherein the agent is a software component of the operator computer;
   (ii) a dashboard application configured to execute on the operator computer and further configured to
   (a) receive status messages from the currency dispenser indicative of a fault therein,
   (b) present the received status messages to the local operator,
   (c) receive an indication from the local operator in response to presenting the status messages, and
   (d) notify the agent to issue a request to create an incident on the remote management system in response to the indication received from the local operator indicating that the fault cannot be resolved without a visit from a service engineer, wherein the agent is notified by the operator computer without the local operator making a request for notification to be sent and based on the currency dispenser being identified as previously being faulty and based on notification of a previous fault communicated from the currency recycler;
   (iii) a control application arranged to control the operation of the currency dispenser and to provide a user interface to the operator; and
   (iv) a communication channel proxy connected to a firmware controller of the currency dispenser and the channel proxy connected to the operator computer having the control application, the communication channel proxy arranged to send the status messages relating to the currency dispenser to the control application for presentation in the user interface and to send the status messages to the agent for delivery to the remote management system, and the communication channel proxy configured to intercept messages transmitted between the control application and the currency recycler and copy those intercepted messages to the dashboard application, wherein the communication channel proxy is further configured to process a message filter to determine where particular messages are to be sent when the messages are intercepted.

2. An assisted service terminal according to claim 1, wherein the dashboard application is arranged to receive status messages directly from the currency dispenser.

3. An assisted service terminal according to claim 1, wherein the agent comprises a simple network management protocol status agent.

4. An assisted service terminal according to claim 1, wherein the agent and the dashboard application are provided as components of a status monitoring application.

5. An assisted service terminal according to claim 1, wherein the dashboard application is arranged to notify the agent to issue a request to create an incident on a remote management system indirectly by creating an event in a repository monitored by the agent.

6. A method of operating an assisted service terminal operable by a local operator trained to correct faults associated with the assisted service terminal, the method implemented as executable instructions residing in a non-transitory computer-readable medium and executed by a hardware processor, the method comprising:
receiving, by the processor, a status message relating to a currency dispenser, where the status message is indicative of a fault in the currency dispenser, wherein receiving further includes receiving the status message from a communication channel proxy connected to a firmware controller of the currency dispenser;
providing, by the processor, details of the fault to the local operator of the assisted service terminal to allow the local operator to attempt to correct the fault;
providing, by the communication channel proxy, the status message to a remote management system;
receiving, by the processor, an indication from the local operator in response to providing the details of the fault;
sending, by the processor, an updated status message from the assisted service terminal in the event that the local operator has corrected the fault; and
sending, by the processor, a request to the remote management system for a service engineer to correct the fault in response to the indication received from the local operator indicating a selection by the local operator that the local operator cannot correct the fault without the local operator having to make the request and based on identifying the currency dispenser as having been previously faulty and based on notification of a previous fault communicated from a currency recycler that is included within or integrated into the currency dispenser, wherein sending further includes intercepting, by the communication channel proxy messages transmitted between a control application and the currency recycler and copying those intercepted messages to a dashboard application and filtering, by the communication channel proxy messages based on a message filter determining where to send particular messages from the intercepted messages.

7. A method according to claim 6, wherein the method comprises the further step of confirming to the operator that a request for a service engineer has been dispatched.

8. A method according to claim 7, wherein the step of confirming to the operator that a request for a service engineer has been dispatched includes displaying an incident code to the operator and/or providing an estimated time when the service engineer will arrive.

9. A managed terminal system comprising:
a central management system for managing a plurality of terminals; and
an assisted service terminal coupled to the central management system by a network, the assisted service terminal operable by a local operator trained to correct faults associated with the assisted service terminal;
wherein the assisted service terminal comprises a currency dispenser that includes a currency recycler, and an operator computer coupled to the currency dispenser, the operator computer including: (i) an agent configured to execute on the operator computer and configured to communicate status information to the central management system, the agent a software component of the operator computer, (ii) a dashboard application configured to execute on the operator computer and configured to (a) receive status messages from the agent indicative of a fault in the currency dispenser, (b) present the received status messages to the local operator, (c) receive an indication from the local operator in response to presenting the status messages, and (d) notify the agent to issue a request to create an incident on the central management system in response to the indication received from the local operator indicating that the fault cannot be resolved without a visit from a service engineer, wherein the operator computer adapted to notify the agent without the local operator having to make a request for notification and based on currency dispenser being identified as having been previously faulty and based on notification of a previous fault communicated from the currency recycler included with and integrated into the currency dispenser; and (iii) a communication channel proxy connected to a firmware controller of the currency dispenser, the communication channel proxy configured to: (a) send the status messages to the dashboard application, (b) send the status message to the central management system, (c) intercept messages transmitted between a control application and the currency recycler, (d) copy those intercepted messages to the dashboard application, and (e) process a message filter to determine where to send particular messages from the messages intercepted.

10. A managed terminal system according to claim 9, wherein the managed terminal system further comprises a self-service terminal.

11. A managed terminal system according to claim 10, wherein the self-service terminal comprises an automated teller machine.

12. A managed terminal system according to claim 9, wherein the central management system creates an incident in response to any status information indicating a fault in the currency dispenser.

13. A managed terminal system according to claim 9, wherein the central management system closes an incident in response to any status information indicating that a previously reported fault in the currency dispenser has now been corrected.

* * * * *